(12) United States Patent
Liais et al.

(10) Patent No.: US 11,891,342 B2
(45) Date of Patent: Feb. 6, 2024

(54) METHOD FOR MANUFACTURING A PART MADE OF COMPOSITE MATERIAL WITH COMPLIANCE CONTROL

(71) Applicants: SAFRAN AIRCRAFT ENGINES, Paris (FR); SAFRAN, Paris (FR)

(72) Inventors: Ludovic Philippe Liais, Moissy-Cramayel (FR); Nicolas Droz, Moissy-Cramayel (FR); Michaël Podgorski, Moissy-Cramayel (FR)

(73) Assignees: SAFRAN AIRCRAFT ENGINES, Paris (FR); SAFRAN, Paris (FR)

( * ) Notice: Subject to any disclaimer, the term of this patent is extended or adjusted under 35 U.S.C. 154(b) by 501 days.

(21) Appl. No.: 17/284,277

(22) PCT Filed: Oct. 4, 2019

(86) PCT No.: PCT/FR2019/052364
§ 371 (c)(1),
(2) Date: Apr. 9, 2021

(87) PCT Pub. No.: WO2020/074813
PCT Pub. Date: Apr. 16, 2020

(65) Prior Publication Data
US 2021/0387921 A1    Dec. 16, 2021

(30) Foreign Application Priority Data
Oct. 12, 2018 (FR) ........................ 1859488

(51) Int. Cl.
C04B 35/80       (2006.01)
C04B 35/117      (2006.01)
(Continued)

(52) U.S. Cl.
CPC ............ *C04B 35/80* (2013.01); *C04B 35/117* (2013.01); *C04B 35/14* (2013.01); *C04B 35/18* (2013.01);
(Continued)

(58) Field of Classification Search
CPC ................................................ C04B 35/62894
See application file for complete search history.

(56) References Cited

U.S. PATENT DOCUMENTS 5,217,657 A * 6/1993 Engle ...................... C04B 35/83
                                                     264/294
5,955,391 A * 9/1999 Kameda ............ C04B 35/62876
                                                   204/192.28
(Continued)

FOREIGN PATENT DOCUMENTS

CN    106029607 A    10/2016
CN    107207354 A     9/2017
(Continued)

OTHER PUBLICATIONS

International Search Report as issued in International Patent Application No. PCT/FR2019/052364, dated Jan. 28, 2020.

*Primary Examiner* — Timothy Kennedy
(74) *Attorney, Agent, or Firm* — Pillsbury Winthrop Shaw Pittman LLP

(57) ABSTRACT

Method for manufacturing a composite material part includes injecting a slurry containing a refractory ceramic particle powder into a fibrous texture, draining the liquid from the slurry that passed through the fibrous texture and retaining the refractory ceramic particle powder inside said texture so as to obtain a fibrous preform loaded with refractory ceramic particles, and demoulding of the fibrous preform. The method includes, after demoulding the fibrous preform, checking the compliance of the demoulded fibrous preform. If the preform is noncompliant, the method also
(Continued)

includes, before a sintering, immersing the demoulded fibrous preform in a bath of a liquid suitable for decompacting the refractory ceramic particles present in the fibrous preform, and additionally injecting a slurry containing a refractory ceramic particle powder into the fibrous preform present in the mould cavity.

14 Claims, 4 Drawing Sheets

(51) Int. Cl.
- *C04B 35/14* (2006.01)
- *C04B 35/18* (2006.01)
- *C04B 35/185* (2006.01)
- *C04B 35/447* (2006.01)
- *C04B 35/488* (2006.01)
- *C04B 35/565* (2006.01)
- *C04B 35/58* (2006.01)
- *C04B 35/584* (2006.01)
- *C04B 35/626* (2006.01)
- *C04B 35/628* (2006.01)
- *C04B 35/64* (2006.01)

(52) U.S. Cl.
CPC .......... *C04B 35/185* (2013.01); *C04B 35/447* (2013.01); *C04B 35/488* (2013.01); *C04B 35/565* (2013.01); *C04B 35/584* (2013.01); *C04B 35/58071* (2013.01); *C04B 35/62655* (2013.01); *C04B 35/62892* (2013.01); *C04B 35/62894* (2013.01); *C04B 35/64* (2013.01); *C04B 2235/3217* (2013.01); *C04B 2235/3244* (2013.01); *C04B 2235/3418* (2013.01); *C04B 2235/3463* (2013.01); *C04B 2235/3804* (2013.01); *C04B 2235/3817* (2013.01); *C04B 2235/3852* (2013.01); *C04B 2235/447* (2013.01); *C04B 2235/5224* (2013.01); *C04B 2235/5228* (2013.01); *C04B 2235/5232* (2013.01); *C04B 2235/5244* (2013.01); *C04B 2235/5248* (2013.01); *C04B 2235/5256* (2013.01); *C04B 2235/604* (2013.01); *C04B 2235/616* (2013.01)

(56) References Cited

U.S. PATENT DOCUMENTS

| | | | |
|---|---|---|---|
| 6,217,997 B1 * | 4/2001 | Suyama | C04B 35/565 |
| | | | 428/294.4 |
| 6,743,393 B1 * | 6/2004 | Petrak | C04B 35/6267 |
| | | | 264/626 |
| 10,329,201 B2 * | 6/2019 | Steibel | F01D 5/284 |
| 2004/0009112 A1 * | 1/2004 | Angier | C04B 35/62675 |
| | | | 423/345 |
| 2004/0105969 A1 | 6/2004 | Huang et al. | |
| 2006/0147368 A1 * | 7/2006 | Angier | C04B 35/62849 |
| | | | 423/345 |
| 2017/0369382 A1 | 12/2017 | Billotte Cabre et al. | |
| 2019/0084891 A1 * | 3/2019 | Steibel | C04B 35/573 |

FOREIGN PATENT DOCUMENTS

WO    WO 2017/060601    4/2017
WO    WO 2017/187050 A1    11/2017

\* cited by examiner

METHOD FOR MANUFACTURING A PART MADE OF COMPOSITE MATERIAL WITH COMPLIANCE CONTROL

CROSS-REFERENCE TO RELATED APPLICATIONS

This application is the U.S. National Stage of PCT/FR2019/052364, filed Oct. 4, 2019, which in turn claims priority to French patent application number 1859488 filed Oct. 12, 2018. The content of these applications are incorporated herein by reference in their entireties.

BACKGROUND OF THE INVENTION

The present invention concerns a method for manufacturing a part made of composite material of the oxide/oxide type or a ceramic matrix (CMC), i.e., having a fibrous reinforcement formed of refractory ceramic fibres and a matrix also of refractory ceramic material.

The production of fibrous textures obtained by three-dimensional weaving between continuous warp and weft threads increases the mechanical strength of the material and in particular its resistance to delamination. In this case and also for 2D fibrous textures of high thickness, only methods using a pressure gradient, such as so-called "RTM" injection moulding methods, allow a loaded slurry to penetrate the fibrous texture, the thickness of which can reach several tens of millimeters depending on the intended applications.

Document WO 2017/060601 describes the injection of a loaded slurry into a fibrous texture. The fibrous texture is maintained in a porous mould that makes it possible to retain in the texture the particles present in the injected slurry while draining the liquid phase from the slurry to the outside of the texture. Document US 2017/369382 describes another method for the injection of a loaded slurry into a fibrous texture. In this document, the fibrous texture is held in a mould cavity of an injection tool comprising a part of porous material in contact with a part of the fibrous texture. The loaded slurry injected into the fibrous texture is drained by the part of porous material so as to retain the particles in the texture while eliminating the liquid phase from it.

However, when these methods are implemented, incidents can occur during the injection phase (appearance of plugs or leaks in the slurry feeding system) or during the demoulding phase (deformation, local tearing, etc.). These incidents can lead to a demoulded preform out of tolerance and/or the appearance of "dry areas" in the preform, i.e., areas devoid of particles and, therefore, the presence of areas devoid of matrix in the final part.

SUBJECT AND SUMMARY OF THE INVENTION

The present invention aims to remedy the abovementioned disadvantages and propose a solution that allows producing parts of composite material of the oxide/oxide or CMC type by injection of a loaded slurry into a fibrous texture, while ensuring both respect for tolerances (geometric and dimensional) and optimization of the deposit and distribution of solid particles in the fibrous texture in order to obtain a material with no dry areas.

For this purpose, the invention proposes a manufacturing method for a fibrous preform of a composite material part, the preform being obtained by:
forming a fibrous texture from refractory ceramic fibres,
shaping the fibrous texture in a mould cavity present in an injection tool,
injecting a slurry containing a refractory ceramic particle powder into the fibrous texture present in the mould cavity,
draining the liquid from the slurry that passed through the fibrous texture and retaining the refractory ceramic particle powder inside said texture so as to obtain a fibrous preform loaded with refractory ceramic particles,
first demoulding of the fibrous preform,
sintering the refractory ceramic particles present in the fibrous preform in order to form a densified refractory matrix in said preform,
characterized in that the method comprises, after the first demoulding of the fibrous preform, the following steps:
immersing the demoulded fibrous preform in a bath of a liquid suitable for decompacting the refractory ceramic particles present in the fibrous preform,
shaping the wet fibrous preform in a mould cavity present in an injection tool,
eliminating the liquid present in the fibrous preform,
additionally injecting a slurry containing a refractory ceramic particle powder into the fibrous preform present in the mould cavity,
draining the liquid from the slurry that passed through the fibrous texture and retaining the refractory ceramic particle powder inside said preform so as to obtain a fibrous preform loaded with refractory ceramic particles,
second demoulding of the fibrous preform.

Thus, with the method of the invention, it is possible to rework a preform which has out of tolerance dimensions and/or areas or porosities devoid of ceramic particles (dry areas) after demoulding. This greatly reduces the rejection rate of the final parts.

According to a particular characteristic of the method of the invention,
This comprises, after the first demoulding step, a step of checking the compliance of the demoulded fibrous preform comprising at least a check of the geometric tolerance, a check of the dimensional tolerance or a check of the injection quality, said demoulded preform being noncompliant when it exhibits an out of tolerance geometry or dimension or one or more areas devoid of ceramic particles.

According to another particular characteristic of the method of the invention, the demoulded fibrous preform is immersed in a water bath kept at a temperature comprised between 20° C. and 80° C.

According to another particular characteristic of the method of the invention, the demoulded fibrous preform is immersed in the water bath for a duration comprised between 30 minutes and 4 hours.

According to another particular characteristic of the method of the invention, the water in the fibrous preform is eliminated by heating said preform at a temperature less than 100° C. The preform is heated in a vacuum chamber with a pressure less than 100 mbar.

According to another particular characteristic of the method of the invention, the additional injection of the slurry is done at a pressure greater than or equal to 6 bars.

During the step of shaping the fibrous texture, the threads can be woven according to a three-dimensional or multilayer weave. The fibrous texture can also be created by stacking layers woven in a two-dimensional weave.

The threads of the preform can be threads formed of fibres made up of one or more of the following materials: alumina, mullite, silica, an aluminosilicate, a borosilicate, silicone carbide and carbon.

The refractory ceramic particles can be of a material chosen from: alumina, mullite, silica, an aluminosilicate, an aluminophosphate, zirconia, a carbide, a boride and a nitride.

According to another particular characteristic of the method of the invention, the method also comprises a step of drying the fibrous preform conducted after the step of draining the liquid from the slurry that passed through the fibrous texture.

In one example of embodiment, the composite material part obtained can be a turbine engine blade.

The invention also concerns a method for producing a composite material part comprising the production of a fibrous preform in accordance with the method according to the invention and also comprising, after the second demoulding step of the preform, a sintering step of the refractory ceramic particles present in the fibrous preform in order to form a densified refractory matrix in said preform.

BRIEF DESCRIPTION OF THE DRAWINGS

Other characteristics and advantages of the invention will appear from the following description of particular embodiments of the invention, given by way of non-limiting examples, in reference to the attached drawings, in which.

DETAILED DESCRIPTION OF EMBODIMENTS

Figure 4:
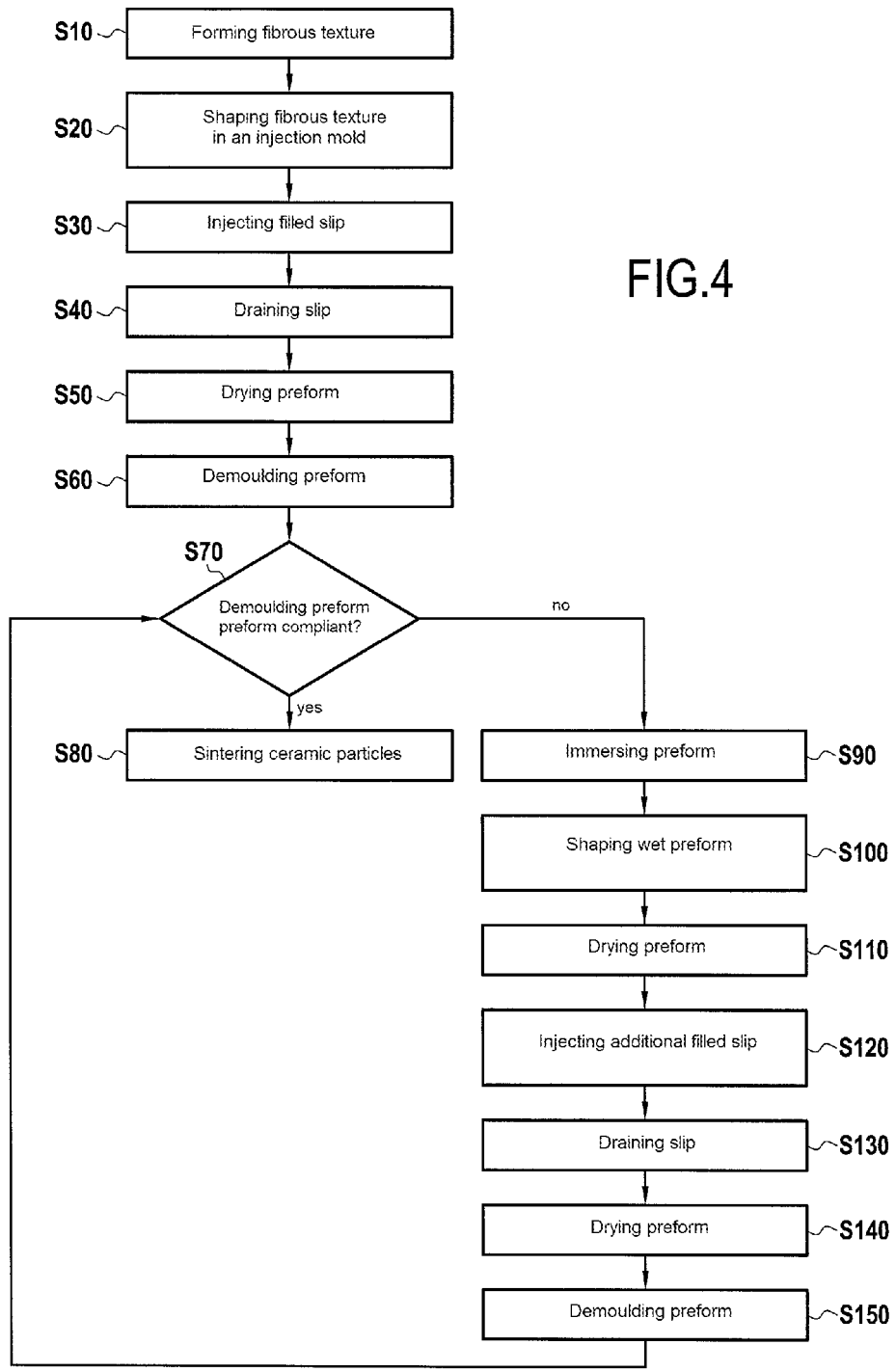
FIG. 4 is a flow chart showing the steps of a method according to the invention.

As indicated in FIG. 4, the method for manufacturing a fibrous preform for the production of a composite material part, especially of the oxide/oxide or CMC type, according to the present invention starts by creating a fibrous texture intended to form the reinforcement for the part (step S10).

The fibrous structure is created in a known way by weaving on at least one jacquard type loom on which a bundle of warp threads or strands has been placed in a plurality of layers, the warp threads being connected by weft threads or vice versa. The fibrous texture can also be created by stacking layers or folds obtained by two-dimensional (2D) weaving. The fibrous texture can also be created directly in a single piece by three-dimensional (3D) weaving. "Two-dimensional weaving" means here a conventional weaving method by which each weft thread passes from one side of the threads of a single layer of warp to the other or vice versa. The method of the invention is particularly suited to allow a loaded slurry to be introduced into 2D fibrous textures, i.e., textures obtained by stacking 2D layers or folds, of substantial thickness, i.e., 2D fibrous structures having a thickness of at least 0.5 mm, preferably at least 1 mm.

"Three-dimensional weaving" or "3D weaving" or "multilayer weaving" means here a weaving method by which at least some of the weft threads connect warp threads on several layers of warp threads or vice versa according to a weave corresponding to a weave pattern which can in particular be chosen from one of the following patterns: interlock, multi-plain, multi-satin and multi-twill.

"Interlock pattern or fabric" means here a 3D weave pattern in which each layer of warp threads connects several layers of weft threads with all the threads of the same warp column having the same movement in the plane of the pattern.

"Multi-plain pattern or fabric" here means a 3D weave with several layers of weft threads whose base pattern of each layer is equivalent to a conventional plain pattern but with certain points of the pattern that connect the layers of weft threads together.

"Multi-satin pattern or fabric" here means a 3D weave with several layers of weft threads whose base pattern of each layer is equivalent to a conventional satin pattern but with certain points of the pattern that connect the layers of weft threads together.

"Multi-twill pattern or fabric" here means a 3D weave with several layers of weft threads whose base pattern of each layer is equivalent to a conventional twill pattern but with certain points of the pattern that connect the layers of weft threads together.

3D textures have a complex geometry into which it is difficult to introduce and homogenously spread solid particles in suspension. The method of the invention is also very well suited to introducing a loaded slurry into 3D fibrous textures.

The threads used to weave the fibrous texture intended to form the fibrous reinforcement of the composite material part can especially be threads made up of one or more of the following materials: alumina, mullite, silica, an aluminosilicate, a borosilicate, silicone carbide, carbon or a mixture of several of these materials.

Figure 1:
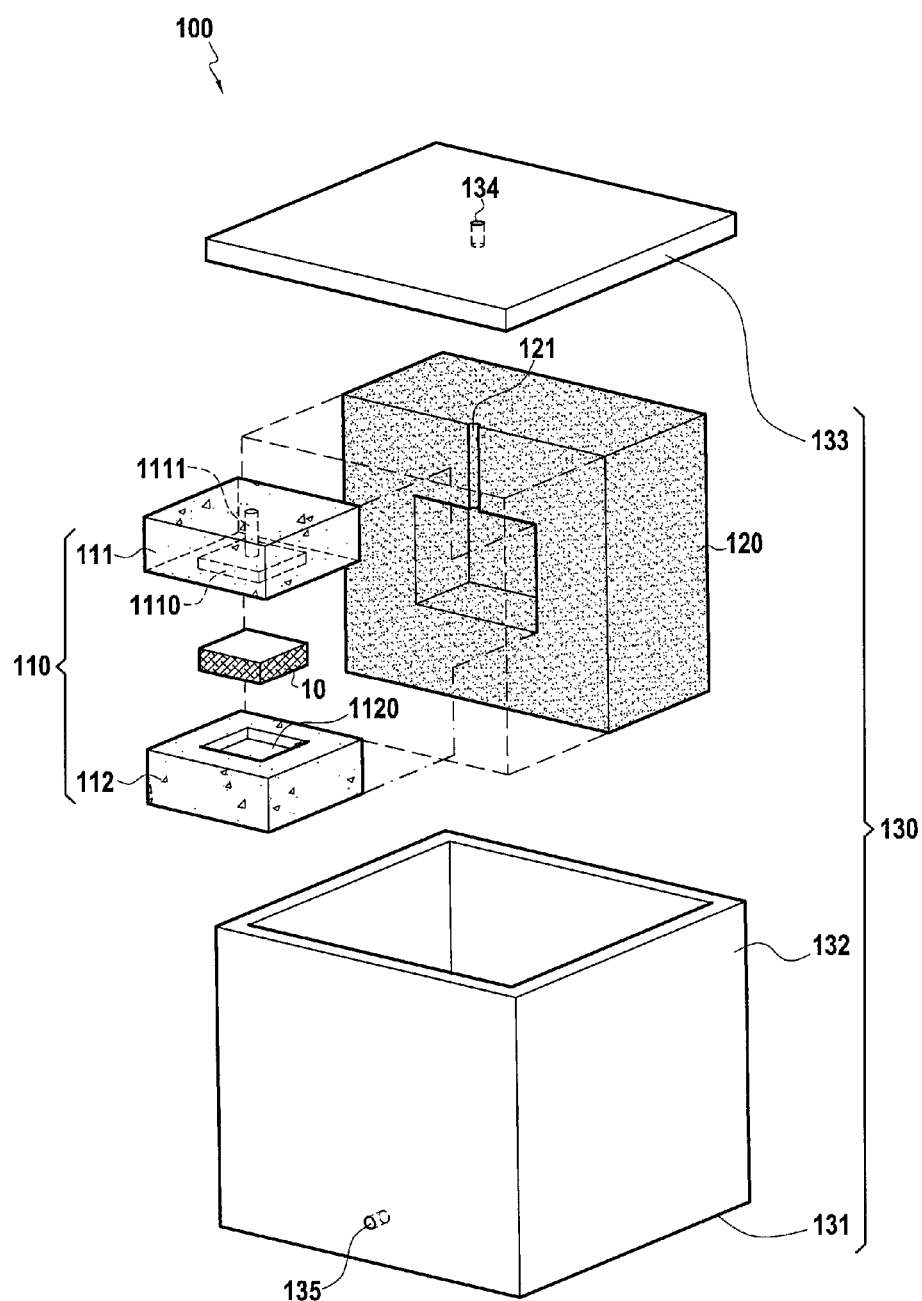
FIG. 1 is an exploded perspective schematic view of an injection tool in accordance with one embodiment of the invention.
Figure 2:
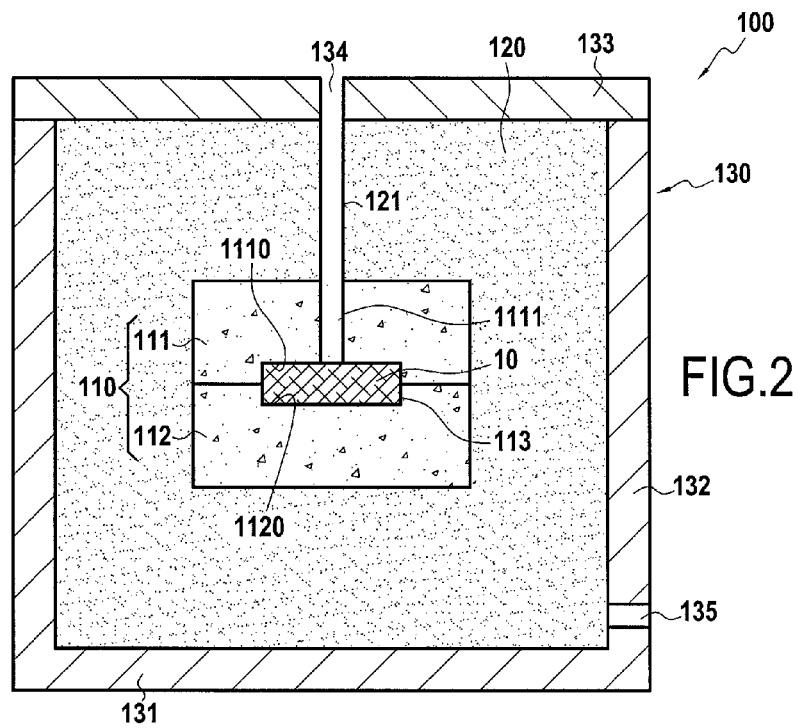
FIG. 2 is a sectional schematic view showing the tool of FIG. 1 closed with a fibrous texture positioned inside it.

Once the fibrous texture is created, it is placed in an injection tool that allows shaping the fibrous texture and depositing the refractory particles inside the fibrous texture, as explained below. For this purpose and as illustrated in FIGS. 1 and 2, a fibrous texture 10 is placed in an injection tool 100. In the example described here, fibrous texture 10 is created according to one of the techniques described above (2D stacked layers or 3D weaving) with Nextel 610™ alumina threads. Fibrous texture 10 is intended here to form the fibrous reinforcement of a composite oxide/oxide blade.

Tool 100 comprises a mould of porous material 110 formed of two parts 111 and 112 each respectively comprising a cavity 1110 and a cavity 1120. Cavities 1110 and 1120 define a mould cavity 113 (FIG. 2) when these two parts 111 and 112 are assembled against one another, the cavity in which the fibrous texture is intended to be placed. Cavities 1110 and 1120 have a shape corresponding to the shape of the part to be fabricated from the fibrous texture. The two parts 111 and 112 serve to size the preform and therefore the part to be obtained as well as to adjust the amount of fibres in the part to be obtained.

In the example described here, part 111 of porous material mould 110 comprises a channel 1111 for injection of a loaded slurry into the fibrous texture as explained below in detail.

Injection tool 100 also comprises an enclosure of rigid material 130 in which porous material mould 110 is held. Enclosure 130 comprises a bottom 131, a side wall 132 of one piece with bottom 131 and a cover 133. Enclosure 130 can be made of any type of material having a sufficient rigidity to resist the injection pressures of the slurry and the and pumping (vacuum draw) to remove the liquid phase from it. The enclosure may in particular be made of metal or plastic material.

Cover 133 has an injection port 134 through which the slurry is intended to be injected in order to penetrate into the porosity of fibrous texture 10. In the example illustrated in FIGS. 1 and 2, the slurry is intended to be injected through an injection port 134 emerging into mould cavity 113. Enclosure 130 has a drainage vent 135 for the liquid medium of the slurry, present here on side wall 132 in the area of bottom 131.

In the embodiment described here, porous material mould 110 has a size less than the internal volume of metal material enclosure 130. In this case, the volume present between the porous material mould and the metal enclosure is filled with a porous medium 120 in order to allow circulation and drainage of the liquid phase of the slurry. Porous medium 120 can particularly be made up of sand, foam, or a granular material. Porous medium 120 contains a passage 121 in communication with both injection port 134 of enclosure 130 and channel 1111 of porous mould 110 in order to inject the slurry into fibrous texture 10.

Porous material mould 110 can be made of a porous resin, for example. By way of non-limiting examples, the following porous resins can be used for the creation of the porous material mould:

Gil-Resin® T with pores of a size comprised between 8 and 13 μm,
Gil-Resin® F+ with pores of a size comprised between 4 and 7 μm,
SamaPore with pores of a size comprised between 3 and 10 μm,
Microplast Fine with pores having an average size of 7 μm.

Porous material mould 110 allows draining the liquid medium of the slurry out of fibrous texture 10 and evacuating it by vent 135 as a result of the application of a pressure gradient between vent 135 and injection port 134.

For example, the mean pore size (D50) of the porous material mould can be comprised between 1 μm and 10 μm.

The texture 10 is shaped by placing it in mould 110 and closing tool 100 (step S20 and FIG. 2).

Figure 3:
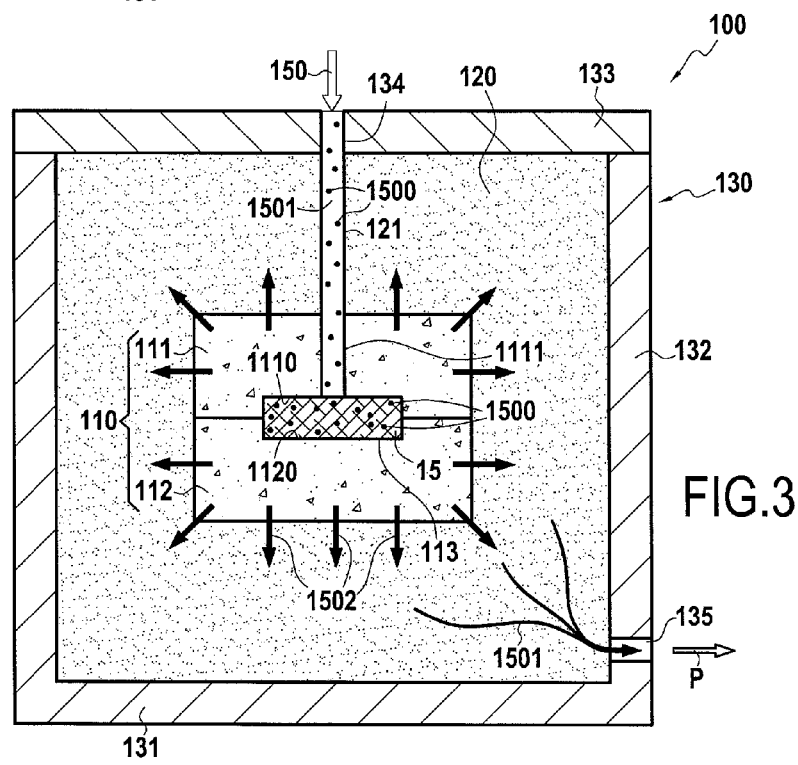
FIG. 3 is a sectional schematic view showing the steps of impregnating a fibrous texture with a loaded slurry in the tool of FIG. 2.

Then a slurry loaded with refractory ceramic particles is injected (step S30 and FIG. 3). FIG. 3 illustrates the configuration obtained during the injection of a slurry 150 and the drainage of the liquid medium or phase from it. Before injecting the slurry into the tool, a vacuum was created within the porous material mould in order to then fill the fibrous texture as much as possible with the slurry. The vacuum draw can be created by pumping at drainage vent 135.

In FIG. 3, slurry 150 has been injected under pressure by injection port 134 and transported to fibrous texture 10 by passage 121 and channel 1111 so as to penetrate into fibrous texture 10. Refractory particles 1500 present in slurry 150 are intended to form a refractory ceramic matrix in the porosity of fibrous texture 10. This refractory ceramic matrix can be, in one example of embodiment, a refractory oxide matrix.

The slurry can be, for example, a suspension of alumina powder in water. The alumina powder used can be an alpha alumina powder sold by the Baikowski company under the name SM8.

More generally, the slurry can be a suspension containing refractory ceramic particles with a mean particle size comprised between 0.1 μm and 10 μm. The content by volume of refractory ceramic particles in the slurry before injection can be comprised between 10% and 50% before injection. The refractory ceramic particles can contain a material chosen from among: alumina, mullite, silica, aluminosilicates, aluminophosphates, carbides, borides, nitrides and mixtures of such materials. Depending on their base composition, the refractory ceramic particles can also be mixed with particles of alumina, zirconia, aluminosilicate, a rare earth oxide, rare earth silicate (which can, for example, be used in environmental or thermal barriers) or any other filler making it possible to functionalize the composite material part to be obtained, such as carbon black, graphite or silicon carbide.

The liquid medium or phase of the slurry can contain, for example an aqueous phase having an acidic pH (i.e., a pH less than 7) and/or an alcohol phase comprising ethanol, for example. The slurry can contain an acidifier such as nitric acid and the pH of the liquid medium can be comprised between 1.5 and 5, for example. The slurry can also contain an organic binder such as polyvinyl alcohol (PVA) that is particularly soluble in water.

As illustrated in FIG. 3, refractory ceramic particles 1500 are present after injection in slurry 150 in the porosity of fibrous texture 10. Arrows 1502 show the movement of the liquid medium or phase 1501 of the slurry drained by porous material mould 110.

A pump P can also be created at outlet vent 135 during drainage, for example by means of a primary vacuum pump. Creating such a pump improves drainage and dries the fibrous texture more quickly.

In this configuration, porous material mould 110 makes it possible to hold refractory ceramic particles 1500 initially present in the slurry in fibrous texture 10 and to deposit all or part of these particles by filtration into fibrous texture 10.

During and/or after injection of the loaded slurry, the liquid phase is drained from it (step S40 and FIG. 3). More precisely, by using a porous material mould 110, liquid medium or phase 1501 of the slurry can be drained from fibrous texture 10 in all directions, liquid medium or phase 1501 then circulating in porous medium 120 to vent 135 by which it is drained from injection tool 100. This drainage of the liquid medium in all directions improves deposition by homogenous and dense sedimentation of refractory ceramic particles 1500 in fibrous texture 10 and consequently obtains a high volume ratio of matrix in the final part.

Moreover, since porous material mould 110 is held in an enclosure of rigid material 130, it can resist the pressures of injecting the loaded slurry into the texture as well as those exerted by pumping to drain the liquid medium from the slurry.

Once the injection and drainage steps are conducted, a fibrous preform 15 filled with refractory ceramic particles, for example, refractory ceramic oxide or alumina particles, is obtained.

The preform obtained is then demoulded in a first step (step S60), which preform must keep the shape and dimensions adopted in the mould cavity after demoulding. Before demoulding, the preform may optionally be dried if necessary (step S50).

In accordance with the invention, the method also comprises a step of checking the compliance of the demoulded preform (step S70).

The preform compliance check comprises all or part of the following checks: geometric tolerance check, dimensional tolerance check and injection check.

The geometric tolerance check consists of checking in a known manner whether the demoulded preform is out of the geometric tolerances or specifications defined previously. The check consists of an inspection of the preform geometry, either overall, or locally (i.e., a portion of the preform). By way of non-limiting examples, the geometric tolerances examined can correspond to admissible deviations of shape, orientation or position. This can be, for example, shape tolerances, tolerance for straightness, flatness, roundness, cylindricity, etc. For orientation tolerances, this can be, for example, tolerance for perpendicularity, parallelism, inclination, etc. For positional tolerances, this can be, for example, tolerance for symmetry, coaxiality, etc. The geometric tolerance check can be performed by known measuring means such as in particular marble, gauge blocks/dial gauge, rods, gauges, microtomography, by X-rays and probes or three-dimensional measuring machines (TMM).

The dimension tolerance check consists of checking in a known manner whether the demoulded preform is out of the dimension tolerances or specifications defined previously. The check consists of an inspection of the dimensions of the preform. The dimensional tolerance check can be performed by known measuring means such caliper, tomography and probes or three-dimensional measuring machine (TMM).

The injection quality check consists of checking whether, after injection of the preform with the loaded slurry, the preform has areas devoid of refractory ceramic particles called "dry areas". As described previously, injection of a loaded slurry and its drainage aim to fill the network of porosities present in the fibrous texture with refractory ceramic particles. In order to ensure an optimal densification of the final part, the entire network of porosities should be filled with particles. The presence of dry areas in the preform after injection and drainage leads to areas of absence of matrix in the final part which are likely to alter its mechanical properties. The presence of dry areas in the demoulded preform can be checked by tomography or by measuring the density of the preform, the density measured being compared to an estimated or calculated target density corresponding to an optimal filling of the porosity network of the preform by particles.

If, after the check, the demoulded fibrous preform is deemed compliant, i.e., it does not have geometry or dimensions out of tolerance and there are no dry areas, the preform is then subjected to a heat sintering treatment (step S80), for example in air at a temperature between 1000° C. and 1200° C. in order to sinter the refractory ceramic particles and thus form a refractory ceramic matrix in the porosity of the fibrous preform. A composite part is thus obtained, for example a material of oxide/oxide composite, provided with a fibrous reinforcement formed by the fibrous preform and having a high matrix volume ratio with a homogeneous distribution of the refractory ceramic matrix throughout the fibrous reinforcement.

In return, if the demoulded fibrous preform is deemed noncompliant, i.e., it has a geometry and/or dimensions out of tolerance and/or one or more dry areas, the preform is subjected to a retouching or reworking cycle conforming to the invention. More precisely, when the inspected preform is deemed noncompliant, it is first immersed in a bath of a liquid suitable for decompacting the particles or grains present in the fibrous preform (step S90). The immersion of the preform in the bath gives it back a flexibility or deformability that makes it possible to shape the fibrous texture again. The loaded slurry is injected into the texture under pressure so that the ceramic particles or grains present in the preform are in a compacted state, which gives rigidity to the preform after its demoulding. Immersing the preform in an appropriate bath of a liquid makes it possible to decompact the particles from each other and to return some flexibility to the preform. The liquid of the bath is preferentially water but can also be an alcohol or any other liquid suitable for decompacting the particles or grains accumulated in the preform and that will not contaminate the preform. Water and alcohol allow diluting any binders present in the liquid phase of the slurry that could rigidify the preform. Finally, immersing the preform in an appropriate liquid bath makes it possible to redistribute the ceramic particles in the network of porosities of the preform and to reopen passages for an additional injection of a loaded slurry.

The water bath temperature is preferably greater than 20° C. and less than 80° C. in order to prevent the appearance of water bubbles that could generate defects in the final part. The bath temperature can be 40° C., for example.

The immersion time of the preform in the water bath is preferably comprised between 30 minutes and 4 hours. This duration can be 2 hours, for example.

Then a new shaping of the wet preform is done (step S100). This shaping can be done in the same mould as the one used for the initial shaping, i.e., in the example described here with mould 110 used in step S20, or in a different mould. The still wet preform is shaped at ambient temperature (20° C.±5° C.).

Once the shaping is done, the mould containing the preform kept in shape is placed in an oven in order to evaporate the liquid contained in the preform (step S110). When this liquid is water, the baking or drying temperature is kept below 100° C. to prevent the water from boiling. However, this temperature is preferably above 80° C. in order to facilitate the evaporation of the water present in the preform confined in the mould. The duration of this preform drying step depends on the temperature applied and the size of the preform. This duration can be comprised between 4 and 24 hours. The preform can be heated in a vacuum chamber with a pressure below 100 mbars.

The dried preform is then subjected to an additional injection step with a slurry loaded with refractory ceramic particles (step S120). This additional injection is possible because the preform is still in a semifinished or green state since the ceramic particles are not consolidated together. There is therefore still a network of porosities (interstices between the particles and between the particles and the fibres) that allow the slurry to circulate in the preform. The injection parameters for the loaded slurry are the same as those defined in the first injection during step S30, in particular with regard to the nature of the slurry used (same ceramic particles and same liquid phase).

The quantity of slurry injected can be adjusted according to the estimated free volume remaining in the preform. If one or more dry areas are present, the measurement of the density of the preform done during the compliance check in step S70 can be used to determine the quantity of refractory ceramic particles to be reinjected.

If the demoulded preform has a geometry and/or dimensions out of tolerance, the duration of injection and filtration/drainage of the slurry can be reduced because the preform is already well impregnated and only requires a new shaping. In this case, this duration can simply be comprised between 2 and 8 hours.

The additional slurry injection is preferably performed at a pressure greater than or equal to 6 bars in order to optimize filling of the preform with the ceramic particles and the compacting thereof.

During and/or after the additional injection of the loaded slurry, the liquid phase is drained from it under the same conditions as those already described for step S40 (step S130).

The preform obtained is then demoulded a second time (step S150) while optionally being dried before demoulding (step 140).

A new compliance check step is then conducted (step S70). Depending on the result of this check, the refractory ceramic particles are then sintered or the preform correction steps are performed again (steps S90 to S150).

Figure 5:
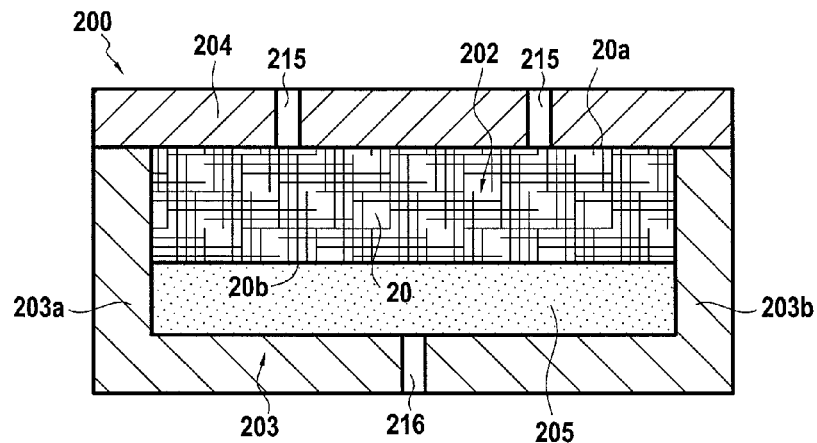
FIGS. 5 and 6 are schematic views showing another example of the injection tool that can be used for the method of the invention.

The steps of shaping (steps S20 and S100), injection/reinjection of the loaded slurry (steps S30 and S120) and drainage/filtration (steps S40 and S130) can be performed with a different tool from the injection tool 100 described previously relative to FIGS. 1 to 3. These steps can also be performed with an injection tool 200 shown in FIG. 5. More precisely, tool 200 comprises a mould cavity 202 defined by a mould 203 and a counter-mould 204 and in which a fibrous texture 20 is placed as described previously. Mould 203 is a rigid support in which fibrous texture 20 is present during the steps of injection/reinjection (steps S30 and S120) and drainage/filtration (steps S30 and S130) Mould 203 contains side walls 203a and 203b defining mould cavity 202. In the example illustrated, tool 200 is closed in its lower part by mould 203 and is closed in its upper part by counter-mould 204 forming a cover closing tool 200. Mould 203 and counter-mould 204 serve to size the preform, and therefore the part to be obtained, as well as to adjust the volume ratio of fibres in the part to be obtained.

Counter-mould 204 contains a plurality of injection ports 215 for the slurry through which the slurry is intended to be injected in order to penetrate into the porosity of fibrous texture 20 through first face 20a of the fibrous texture. Mould 3 contains an outlet vent 216 for the liquid medium of the slurry.

In the example illustrated, a porous material part 205 is present in mould cavity 202 between mould 203 and fibrous texture 20. Porous material part 205 is present between outlet vent 216 and fibrous texture 20. Porous material part 205 is present in contact with mould 203 and in contact with second face 20b of fibrous texture 20 through which the drainage of the liquid medium of the slurry is intended to be carried out. Porous material part 205 can be made of microporous polytetrafluoroethylene (PTFE), for example, such as the "microporous PTFE" products sold by Porex®. For example, to create porous material part 205, the material PM 0130 sold by the Porex® company having pore sizes comprised between 1 μm and 2 μm can be used. Porous material part 205 makes it possible to drain the liquid medium of the slurry out of fibrous texture 20 and to evacuate it by outlet vent 216 as a result of the application of a pressure gradient between outlet vent 216 and injection ports 215.

Porous material part 205 has a thickness greater than or equal to 0.1 mm. For example, porous material part 205 can have a thickness greater than or equal to 1 mm or even several millimeters. The mean porosity of the porous material part can be approximately 30%. The mean pore size (D50) of the porous material part can be comprised between 1 μm and 2 μm.

Figure 6:
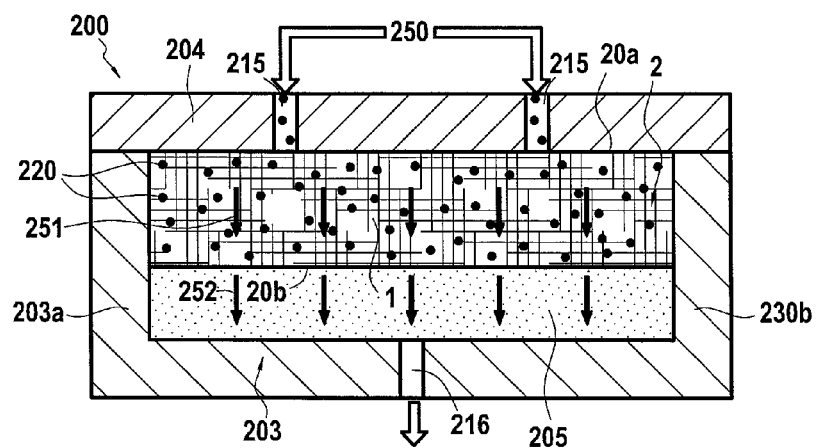

FIG. 6 illustrates the configuration obtained during injection of the slurry and drainage of the liquid medium. The slurry is injected by injection ports 215 so as to penetrate into fibrous texture 20 through first face 20a of the fibrous texture. Refractory ceramic particles 220 present in the slurry are intended to form a refractory ceramic matrix in the porosity of fibrous texture 20. The examples of slurries described previously can also be used here.

As illustrated in FIG. 6, refractory ceramic particles 220 are present after injection of the slurry into the porosity of fibrous texture 20. Arrows 251 show the movement of the slurry injected into fibrous texture 20 while arrows 252 show the movement of the liquid medium of the slurry drained by porous material part 205.

In this configuration, porous material part 205 makes it possible to hold refractory ceramic particles 220 initially present in the slurry in fibrous texture 20 and for all or part of these particles 220 to be deposited by filtration into the fibrous texture. With the configuration of tool 200 using a porous material part for drainage, a step of drying the fibrous preform is conducted after each step of draining the liquid from the slurry that passed through the fibrous texture.

Once the injection/reinjection and drainage/filtration steps are conducted, a fibrous preform is obtained, filled with refractory ceramic particles, for example, refractory ceramic oxide or alumina particles.

The preform obtained is then dried and demoulded. Conforming to the invention, a step of checking the compliance of the demoulded preform (step S70) is then done. Depending on the result of this check, the refractory ceramic particles are then sintered (step S80) or the preform correction steps are performed (steps S90 to S150) as already described previously.

A composite part is thus obtained, for example a material of oxide/oxide composite, provided with a fibrous reinforcement formed by the fibrous preform, the part having a geometry and dimensions compliant with the specifications defined as well as a high matrix volume ratio with a homogeneous distribution of the refractory ceramic matrix throughout the fibrous reinforcement (no dry areas).

A part of CMC composite material other than oxide/oxide can be obtained in the same way by creating the fibrous texture with silicon carbide and/or carbon fibres and by using a slurry loaded with particles of carbide (for example SiC), boride (for example, $TiB_2$) or nitride (for example, $Si_3N_4$).

The invention claimed is:
1. Manufacturing method for a fibrous preform of a composite material part, the preform being obtained by:
    forming a fibrous texture from refractory ceramic fibres,
    shaping the fibrous texture in a mould cavity present in an injection tool,
    injecting a slurry containing a refractory ceramic particle powder into the fibrous texture present in the mould cavity,
    draining the liquid from the slurry that passed through the fibrous texture and retaining the refractory ceramic particle powder inside said texture so as to obtain a fibrous preform loaded with refractory ceramic particles,
    first demoulding of the fibrous preform,
    wherein the method also comprises, after the first demoulding of the fibrous preform, the following steps:
    immersing the demoulded fibrous preform in a bath of a liquid suitable for decompacting the refractory ceramic particles present in the fibrous preform,
    shaping the wet fibrous preform in a mould cavity present in an injection tool,
    eliminating the liquid present in the fibrous preform,
    additionally injecting a slurry containing a refractory ceramic particle powder into the fibrous preform present in the mould cavity, draining the liquid from the slurry that passed through the fibrous preform and retaining the refractory ceramic particle powder inside said texture so as to obtain a fibrous preform loaded with refractory ceramic particles, second demoulding of the fibrous preform.

2. The method according to claim 1, comprising, after the first step of demoulding the fibrous preform, a step of checking the compliance of the demoulded fibrous preform comprising at least a check of the geometric tolerance, a check of the dimensional tolerance or a check of the injection quality, said demoulded preform being noncompliant when it exhibits an out of tolerance geometry or dimension or one or more areas devoid of ceramic particles.

3. The method according to claim 1, wherein the demoulded fibrous preform is immersed in a water bath kept at a temperature comprised between 20° C. and 80° C.

4. The method according to claim 3, wherein the demoulded fibrous preform is immersed in the water bath for a duration comprised between 30 minutes and 4 hours.

5. The method according to claim 3, wherein the water in the fibrous preform is eliminated by heating said preform at a temperature less than 100° C.

6. The method according to claim 1, wherein the additional injection of the slurry is done at a pressure greater than or equal to 6 bars.

7. The method according to claim 1, wherein, during the step of shaping the fibrous texture-, the threads are woven according to a three-dimensional or multilayer weave.

8. The method according to claim 1, wherein the threads of the fibrous texture are formed of fibres made up of one or more of the following materials: alumina, mullite, silica, an aluminosilicate, a borosilicate, silicone carbide and carbon.

9. The method according to claim 1, wherein the refractory ceramic particles are of a material chosen from: alumina, mullite, silica, an aluminosilicate, an aluminophosphate, zirconia, a carbide, a boride and a nitride.

10. The method according to claim 1, also comprising a step of drying the fibrous preform conducted after the step of draining the liquid from the slurry that passed through the fibrous texture.

11. The method according to claim 1, wherein the composite material part obtained is a turbine engine blade.

12. Method for producing a composite material part comprising the production of a fibrous preform in accordance with the method according to claim 1 and also comprising, after the second demoulding step of the preform, a sintering step of the refractory ceramic particles present in the fibrous preform in order to form a densified refractory matrix in said preform.

13. The method according to claim 2, wherein the demoulded fibrous preform is immersed in a water bath kept at a temperature comprised between 20° C. and 80° C.

14. The method according to claim 4, wherein the water in the fibrous preform is eliminated by heating said preform at a temperature less than 100° C.

* * * * *